June 30, 1953  J. MIRON  2,643,650
FOOD CONTAINER AND HEATING MEANS THEREFOR
Filed June 7, 1950
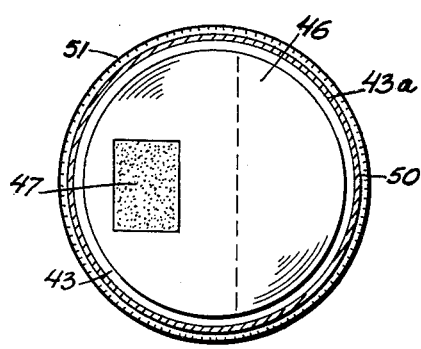
𝔽𝕀𝔾 - 2
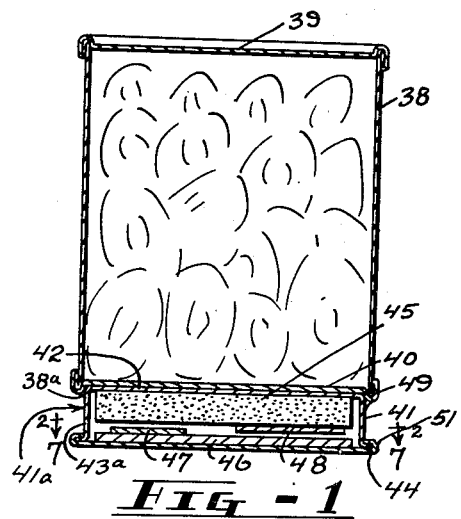
𝔽𝕀𝔾 - 1
INVENTOR
JACQUES MIRON
by Edward N. Fetherstonhaugh
ATTORNEY Patented June 30, 1953

2,643,650

UNITED STATES PATENT OFFICE 2,643,650

FOOD CONTAINER AND HEATING MEANS THEREFOR

Jacques Miron, St. Laurent, Quebec, Canada

Application June 7, 1950, Serial No. 166,653

2 Claims. (Cl. 126—262)

The invention relates to improvements in food containers and heating means therefor, as described in the present specification and illustrated in the accompanying drawings that form a part of the same.

The invention consists essentially of the novel features in construction as pointed out broadly and specifically in the claims for novelty following a description containing an explanation in detail of acceptable forms of the invention.

The objects of the invention are to devise food containers each of which has its own individual heating means combined therewith; to provide food containers in which the contents may be heated and/or cooked without the use of stoves; to furnish containers for food or other substances requiring heat to bring the same to a condition for use, in which the source of heat is wholly contained therein; to combine a food container and the heating means therefor; to enable food to be heated and/or cooked in its container without the use of stoves or outside fire, being especially adapted for use on camping trips or other outdoor activities where a fire is not available or practical for cooking, as well as being of special use for indoor cooking of the food as contained in the container; to construct a food container and heating means therefor consisting of few and simple parts, easily and inexpensively manufactured; and generally to provide food containers and heating means therefor combined therewith that are durable in construction and in which the contents may be heated and/or cooked at any time and in any place.

In the drawings:

Figure 1 is a vertical sectional view through the container and showing the heating means as a separate unit assembly attached to the container bottom on the outside thereof.

Figure 2 is a plan sectional view as taken on the line 2—2 in Figure 1.

Like numerals of reference indicate corresponding parts in the various figures.

Referring to the drawings, the container, as indicated by the numeral 38, is provided with a completely enclosed heating element in the form of a unit assembly that is separately attached to the container bottom on the outside thereof.

This container 38 is the conventional type of can, having the top 39 and the bottom 40, the interior being free of partitions or false bottoms.

The heating means for the container 38 comprises a shallow receptacle 41 having a closed top 42 and with a flat surfaced bottom face 43 that is suitably and movably secured to the side wall 43ᵃ of the receptacle and adapted to be turned with respect to the same. In this instance, the bottom edge of the circumferential side wall 43ᵃ is outwardly turned forming a flange 44, the bottom 43 being turned back over this flange 44, as shown in Figure 1.

The heating element or fuel consists of a cake 45 of inflammable material, such as a suitable type chemical or compound in solid form, and this cake is fixedly secured to the inside face of the top 42 of the receptacle 41 by any suitable means. An insulating pad 46 is fixedly secured to the inside face of the bottom of the receptacle by any suitable means and has a section of an abrasive material, 47, such as a piece of sandpaper, fixedly secured to its top face. The cake 45 of fuel extends downward from the receptacle top to within a short distance of the top of the insulating pad but does not come in contact therewith. The bottom face of the cake 45 has located thereon and fixedly secured thereto, a strip 48 or section of a material that is easily ignited by friction, this section having a composition similar to that of the head of a match.

The receptacle 41 is fixedly mounted on the bottom of the container 38 by any suitable means, such as by having a circumferential edge 38ᵃ turned up and soldered or otherwise fixed to the crimped and sealed section 49 of the container bottom 43, as shown in Figure 1, this entire unit 41ᵃ thus being attachable to the preconstructed can or container.

In using the container, when it is desired to heat and/or cook the contents of the same, all that is necessary is to turn the bottom 43 of the receptacle 41 around until the section of abrasive material, 47, or "striker" is brought around under the ignitable section 48 fixedly secured in connection with the cake of fuel, the two sections being brought into contact with one another, the turning of the bottom 43 causing frictional contact, the section 48 igniting and in turn lighting the cake of fuel, for the heating of the container and its contents.

The portion 51 of the bottom that is turned back over the flange 44, is knurled or otherwise roughed to facilitate turning same. A small punched-in section or bubble 50 is located in the sections 51 and 44 and serves to keep the cover 43 in position until manually turned.

In connection with the frictional igniting of the cake 45, the contactable elements 47 and 48 might be of different composition from that herein described but of a nature that frictional contact therebetween produces a spark or flame for the ignition of the fuel cake.

In connection with the chemical compound used with all of the above described bodies of fuel, the same is a type of inflammable material that requires little or no oxygen for combustion, a suitable material being, sulphur, solidified alcohol, metallic powder or other chemical material suitable to give off heat by chemical reaction with or without the help of atmospheric oxygen.

It is of course understood that modifications and ramifications may be made without in any way departing from the spirit of the invention as hereinabove described and illustrated.

What I claim is:

1. In a container for food and heating means therefor, a metal container having a food product hermetically sealed therein, means for heating said container and contents thereof located on the outside of the container in fixed attachment thereto, said means comprising a receptacle fixedly secured to the bottom of said container, a body of inflammable material located within said receptacle, elements wihin said recepacle adapted, when brought into frictional engagement with one another, to ignite the said body of inflammable material, and means forming a part of said receptacle and movable thereon adapted to be manually manipulated for bringing said elements within the receptacle into frictional engagement with one another.

2. In a container for food and heating means therefor, a metal container having a food product hermetically sealed therein, heating means located at the bottom of said container on the outside thereof and being self-contained with respect thereto, a closed metal receptacle forming a housing for said heating means, said receptacle being suitably and fixedly secured to the bottom of said container, the said heating means comprising insulating material fixed to the inside face of the bottom of the receptacle, abrasive material fixed to the top of the said insulating material, the bottom of said receptacle comprising a section movably secured to the side walls thereof and adapted to be manually turned, a suitable mass of inflammable chemical in solid form fixedly secured to the inside face of the top of said receptacle and extending downward therefrom, said solid inflammable chemical comprising a section of ignitable material fixed to the under face of same, said movable section of the receptacle, on being turned, bringing said abrasive material into frictional engagement with the said ignitable material on the solid chemical to thereby ignite the same which in turn ignites the chemical.

JACQUES MIRON.

References Cited in the file of this patent
UNITED STATES PATENTS

| Number | Name | Date |
|---|---|---|
| 263,923 | Manuel | Sept. 5, 1882 |
| 802,256 | Bamberger et al. | Oct. 17, 1905 |
| 824,938 | Lang | July 3, 1906 |
| 1,173,454 | Nakamizo | Feb. 29, 1916 |
| 1,309,418 | Nakamizo | July 8, 1919 |
| 1,325,515 | Hartman | Dec. 23, 1919 |
| 2,261,467 | Hanson | Nov. 4, 1941 |
| 2,327,412 | Fink | Aug. 24, 1943 |
| 2,581,131 | Naranick | Jan. 1, 1952 |

FOREIGN PATENTS

| Number | Country | Date |
|---|---|---|
| 12,763 | Great Britain | of 1904 |
| 24,270 | Great Britain | of 1910 |
| 179,732 | Switzerland | Dec. 2, 1935 |